US011518714B2

(12) United States Patent
Sardou et al.

(10) Patent No.: US 11,518,714 B2
(45) Date of Patent: Dec. 6, 2022

(54) METHOD FOR MANUFACTURING AN ELASTIC CERAMIC MATRIX COMPOSITE

(71) Applicants: Max Sardou, Saint-Soupplets (FR); Patricia Sardou, Saint-Soupplets (FR)

(72) Inventors: Max Sardou, Saint-Soupplets (FR); Patricia Sardou, Saint-Soupplets (FR)

(*) Notice: Subject to any disclaimer, the term of this patent is extended or adjusted under 35 U.S.C. 154(b) by 933 days.

(21) Appl. No.: 16/334,268

(22) PCT Filed: Sep. 16, 2016

(86) PCT No.: PCT/FR2016/000140
§ 371 (c)(1),
(2) Date: Mar. 18, 2019

(87) PCT Pub. No.: WO2018/050970
PCT Pub. Date: Mar. 22, 2018

(65) Prior Publication Data
US 2019/0210923 A1    Jul. 11, 2019

(51) Int. Cl.
| | | |
|---|---|---|
| *C04B 28/00* | (2006.01) | |
| *C04B 35/80* | (2006.01) | |
| *C04B 35/628* | (2006.01) | |
| *C04B 20/10* | (2006.01) | |
| *C04B 35/634* | (2006.01) | |
| *C04B 35/76* | (2006.01) | |
| *C04B 35/117* | (2006.01) | |
| *C04B 35/14* | (2006.01) | |
| *C04B 35/18* | (2006.01) | |
| *C04B 35/447* | (2006.01) | |
| *C04B 35/46* | (2006.01) | |
| *C04B 35/488* | (2006.01) | |
| *C04B 35/565* | (2006.01) | |
| *C04B 14/30* | (2006.01) | |
| *C04B 14/32* | (2006.01) | |
| *C04B 20/00* | (2006.01) | |
| *C04B 22/06* | (2006.01) | |
| *C04B 22/08* | (2006.01) | |
| *C04B 24/42* | (2006.01) | |
| *C04B 40/00* | (2006.01) | |
| *C04B 111/34* | (2006.01) | |

(52) U.S. Cl.
CPC .......... *C04B 28/006* (2013.01); *C04B 14/303* (2013.01); *C04B 14/305* (2013.01); *C04B 14/306* (2013.01); *C04B 14/324* (2013.01); *C04B 20/0048* (2013.01); *C04B 20/1051* (2013.01); *C04B 20/1066* (2013.01); *C04B 22/062* (2013.01); *C04B 22/082* (2013.01); *C04B 24/42* (2013.01); *C04B 35/117* (2013.01); *C04B 35/14* (2013.01); *C04B 35/18* (2013.01); *C04B 35/447* (2013.01); *C04B 35/46* (2013.01); *C04B 35/488* (2013.01); *C04B 35/565* (2013.01); *C04B 35/628* (2013.01); *C04B 35/62802* (2013.01); *C04B 35/62805* (2013.01); *C04B 35/62821* (2013.01); *C04B 35/62823* (2013.01); *C04B 35/634* (2013.01); *C04B 35/76* (2013.01); *C04B 35/80* (2013.01); *C04B 40/0039* (2013.01); *C04B 2111/34* (2013.01); *C04B 2235/483* (2013.01); *C04B 2235/52* (2013.01); *C04B 2235/5212* (2013.01); *C04B 2235/5216* (2013.01); *C04B 2235/5228* (2013.01); *C04B 2235/5248* (2013.01); *C04B 2235/5409* (2013.01); *C04B 2235/5454* (2013.01); *C04B 2235/96* (2013.01); *Y02P 40/10* (2015.11)

(58) Field of Classification Search
CPC ... C04B 14/303; C04B 14/305; C04B 14/306; C04B 14/324; C04B 20/0048; C04B 20/008; C04B 20/1051; C04B 20/1066; C04B 22/062; C04B 22/083; C04B 24/42; C04B 28/006; C04B 35/628; C04B 35/62802; C04B 35/62805; C04B 35/62823; C04B 35/634; C04B 35/76; C04B 35/80; C04B 35/803; C04B 35/806; C04B 40/0039
See application file for complete search history.

(56) References Cited

U.S. PATENT DOCUMENTS 3,943,217 A * 3/1976 Rother ................. C04B 35/634
264/122
5,601,674 A * 2/1997 Szweda ................. C04B 33/36
269/65

FOREIGN PATENT DOCUMENTS

FR    2985729 A1    7/2013
FR    3030501 A1    6/2016
(Continued)

OTHER PUBLICATIONS

International Search Report, dated Jul. 21, 2017, from corresponding PCT application No. PCT/FR2016/000140.

*Primary Examiner* — Anthony J Green
(74) *Attorney, Agent, or Firm* — Nixon & Vanderhye

(57) ABSTRACT

Disclosed are: damage-resistant ECMCs that need to work and remain elastic between minus 120° C. and positive 300° C.; ECMCs that need to be able to contain a flame of 1900° C. for more than 90 minutes; and composite structures, especially highly stressed structures. One of the characteristic problems of ceramic matrices is their fragility. Indeed, when a fracture starts, it propagates easily in the matrix. Disclosed are elastic ceramic matrix composites (ECMCs), for which: the ceramic matrix is split into solid "ceramic microdomains" (CMDs); the CMDs are connected to one another by a dense network of "elastic microelements" (EMEs); and the bonds between the EMEs and the CMDs are strong chemical bonds, preferably covalent.

16 Claims, 2 Drawing Sheets

(56) References Cited

FOREIGN PATENT DOCUMENTS

| FR | 3033557 | A1 |   | 9/2016 |
|----|---------|----|---|--------|
| RU | 2034892 | C1 | * | 5/1995 |
| SU | 1237650 | A  | * | 6/1986 |

\* cited by examiner

METHOD FOR MANUFACTURING AN ELASTIC CERAMIC MATRIX COMPOSITE

The present invention relates to a method for Ceramic Composites, Elastic Matrix, (CCEM) production. This damage tolerant having mechanical properties similar to those of epoxy-based composites. We already know processes for making ceramics, but they are dramatically fragile!

In the state of the prior art, the procedure to produce ceramic is as follows:

Step 1: Silica is dissolved in an alcaly solution (preferably Phil) consisting of water (5) (FIG. 5) and an alcaly, for example KOH (or NaOH) (6) (FIG. 5) a transparent liquid is then obtained containing silicon atoms positioned in the center of tetrahedral whose vertices are formed by four oxygen atoms, each oxygen atom bearing a hydrogen (system called silicate (4) (FIG. 5)) floating in the said liquid. We thus have a so called "mineral hardener"

Step 2: then pouring said mineral hardener on dry powder (3) (FIG. 5) for example Metakaolin (mineral matrix class b), then intimately mixed, a "slip" is obtained.

Step 3: It is then possible, for example, with the slip, to impregnate a fibrous reinforcement, in order to obtain a "ceramic composite", it is then necessary to place the assembly in a hermetic mold and then to heat, for example to 60° C. for 40 minutes (or 6 minutes at 120° C.) to obtain a polycrystallization (2) (FIG. 5) of oxide ceramic, see FIG. 3. (CMD). This type of ceramic composite has particularly poor mechanical properties. The flaws of this process are that it leads to the manufacture of an extremely fragile ceramic that breaks at the slightest stress, especially in tension and shear.

TECHNICAL PROBLEM TO BE RESOLVED

Composite matrices consisting of layers containing reinforcing fibers (unidirectional woven, felt, or mat) and matrix: organic, mineral, or ceramic, are increasingly used to make light structures such as those described in the art. 'invention'. When placed under significant stress or during shocks, these composite structures are subject to deformation. The conventional ceramic matrices are extremely fragile and do not tolerate significant deformations.

The goal of CCEM is to behave mechanically and to perform as organic matrices, while having a much wider thermal range of use, and a significantly lower cost of ownership. The subject of the present invention is a method developed for producing a ceramic composite with an elastic matrix, which is characterized by the fact that it comprises the following steps:

Step 1: an admixture comprising at least one of the following elements is dispersed in water: an alkali (or) an acid, to obtain "an adjuvant in aqueous solution", Step 2: then, in the said adjuvant in aqueous solution, an additive is reacted to obtain a "mineral hardener"

Step 3: the preparation of a "fluid silicone homopolymer with active terminations" is carried out, Step 4: Finally we prepare a "mineral resin powder"

Step 5: said mineral hardener is poured and intimately mixed in said mineral resin powder to form a "ceramic mixture"

Step 6: the active-terminated fluid silicone homopolymer is then dispersed in the ceramic mixture to obtain said "elastic ceramic mixture"

According to another characteristic, the method is distinguished by the fact that it further comprises: a step 7, consisting in impregnating said "elastic ceramic mixture" obtained at the end of step 6, with means of "fibrous reinforcements", we then obtain a "ceramic composite with elastic matrix", CCME The method includes an additional step 8, consisting in dispersing, in the mixture, a micro-reinforcement network constituted by "dendritic nanofractals", said step 8 being carried out at one of the following occurrences: between step 5 and the step 6, between step 6 and step 7.

According to another characteristic the process is distinguished by the fact that: said alkali is constituted by a combination and at least one of the following bases: KOH=potassium hydroxide, NaOH=sodium hydroxide, CsOH=cesium hydroxide, LiOH=lithium hydroxide and the said acid being constituted by minus one of the following acids: HCl=hydrochloric acid, H2SO4=sulfuric acid, HF=hydrofluoric acid, $H_3PO_4$=phosphoric acid, to obtain an "adjuvant in aqueous solution"

said additive is constituted by at least one of the following elements: an oxide (silicon, aluminum, magnesium, zirconium, calcium), a metal (aluminum, magnesium, zirconium, of calcium) a metalloid (of silicon), to obtain a "mineral hardener"

said mineral resin powder consists of at least one of the following elements: *a mineral polymer [consisting of a poly(sialate), (Si/Al ratio=1)], a mineral polymer [consisting of a poly(sialate-siloxo), (ratio Si/Al=2)], a mineral polymer [consisting of an aluminosilicate, poly (sialate-disiloxo), (Si/Al ratio=3) namely (—Si—O—Al—O—)$_n$ such as metakaolin $(Si_2O_5,Al_2O_2)_n$, a mineral polymer [consisting of an aluminosilicate, poly (sialate-disiloxo), namely (—Si—O—Al—O—)$_n$ such as metakaolin $(Si_2O_5, Al_2O_2)_n$ supplemented with aluminum phosphate $(AlPO_4)$ a complex mineral polymer [consisting of a poly(sialate-disiloxo) aluminosilicate, (Si/Al ratio=3) namely (—Si—O—Al—O—)$_n$ such as metakaolin $(Si_2O_5,Al_2O_2)_n$ and a micronized alumina namely. $(Al_2O_3)$]; A complex mineral polymer [consisting of a poly(sialate-disiloxo) aluminosilicate, (Si/Al ratio=3) namely (—Si—O—Al—O—)$_n$ such as metakaolin $(Si_2O_5,Al_2O_2)_n$ and d a micronized zirconium oxide, namely. $(ZrO_2)$]: a complex mineral polymer [consisting of a poly(sialate-disiloxo) aluminosilicate, (Si/Al ratio=3) namely (—Si—O—Al—O—)$_n$ such as metakaolin $(Si_2O_5,Al_2O_2)_n$ of a micronized magnesium oxide namely (MgO)]; A complex mineral polymer [consisting of a poly(sialate-disiloxo) aluminosilicate, (Si/Al ratio=3) namely (—Si—O—Al—O—)$_n$ such metakaolin $(Si_2O_5,Al_2O_2)_n$ of a micronized calcium oxide ie (CaO)].

said active-terminated liquid silicone hormopolymer of step 6 consists of at least one of the following terminations: OH-terminus, H-terminus, H-terminal hybrid on one side and OH on the other, termination alcohol (methanol), alcohol (ethanol) terminus, to obtain said "flexible ceramic mixture".

According to another characteristic, The process is distinguished by the fact that: "dendritic nanofractals" have nanopatatoid forms (16) of 10 to 50 nanometers in diameter aggregated together by covalent bonds to thereby form dendrites (13, 15), circumscribed in a patatoid volume of 50 to 1000 nanometers in diameter, the surface values of said dendritic nanofractals being included in a range of values whose lower limit is about 10 square meters per gram and whose upper limit, is about 750 square meters per gram (measured according to the BET method), The process is distinguished by the fact that the dendritic nanofractals consist of a combination of at least one of the following products: *Metal oxides, for example titanium oxide $TiO_2$ or zirconium oxide $ZrO_2$, non-functionalized. *Metallic oxides, for example alumina $Al_2O_3$, preferentially functionalized. *Metalloid oxide such as silicon oxide, for example silicon dioxide $SiO_2$, boron oxide, boric anhydride by $B_2O_3$ anhydrous borax, preferentially functionalized. *Metalloidal oxide such as SiC silicon carbide nonfunctionalised. *Non-metals, such as phosphorus oxide, phosphoric anhydride ($P_2O_5$); carbon black which is colloidal carbon (graphite) nonfunctionalised.

According to another characteristic, the method is distinguished by the fact that the "fibrous reinforcements" are chosen from at least one of the following materials: *Functionalized boron fibers. *Functionalized silica. *Functionalized quartz. *Basalt functionalized preferentially. *Functionalized glass. *Unfunctionalized carbon. *Non-functionalized silicon carbide. *Functionalized ceramics (eg. alumina, alumina mullite). *Non-functionalized zirconium. *Functionalized stainless steel. *Inconel non-functionalized. *Functionalized polyisilazane. *Aramid non-functionalized *Polyethylene HD (Example DYNEEMA).

According to another advantageous characteristic:

Step 1: to disperse, an active-terminated liquid silicone homopolymer (1), for example, polydimethylsiloxanes (PDMS), very homogeneously, in the mineral powder (3) (a-class mineral matrix). This operation produces a pasty Step 2: then pour on the pasty mixture obtained in step 1 a water solution preferably added with a crosslinking agent (peroxide or platinum, alkaline solution, zinc oxide or magnesium), then intimately mixed a slip is obtained. The role of the crosslinking agent is to assist the branching of active-terminated fluid silicone homopolymers (1) on the ceramic micro-domains (2) CMD.

Step 3: It is then possible for example to impregnate a fibrous reinforcement, one then obtains a "ceramic composite with elastic matrix" then to place the assembly in a hermetic mold then to heat, for example to 60° C. during 40 minutes (or 6 minutes at 120° C.) to obtain a polycrystallization (2) of oxide ceramic, see FIG. 3. (CMD). *In the case of solution 2, the proportion of homopolymers to be used, in mass of dry matter, can vary between 5% and 50% of the total matrix mass produced, depending on the type of flexibility sought.

The Si—O bonds are strong, it is greater than that of the C—O bonds; this gives the "elastic ceramic matrix composite" a: * great chemical inertia; * good resistance to UV (ultraviolet); * high degradation temperature; * Excellent ratings in fire resistance and smoke release.

A covalent bond is a strong chemical bond in which two atoms share two electrons (an electron each or two electrons from the same atom) of one of their outer layers to form a pair of electrons bonding the two atoms. It is one of the strongest forces that produce mutual attraction between atoms. Cyclic oligomers $(Si—O)_n$, where n is between 2 and 5, has its oxygen atoms which are linked by double bond (covalent) to the silicon atoms of a ring where silicon atoms alternate with atoms of silicon and oxygen: in such a structure, oxygen is still divalent and silicon is still tetravalent.

In all cases:

The preferred mineral ceramic matrix called "oxide ceramic" is chosen from the following materials:

1) A so-called class "A" of alkali ceramic matrix:

Alcoholates [generic formula $M(OR)_n$ where M is a metal or silicon and R is an organic alkyl $C_nH_{2n+1}$.]; Tetrathoxysilane (TEOS); Alumina: micronized, pyrogenous Silica: micronized, precipitated, pyrogenized micronized magnesium oxide ie. (MgO) micronized zirconium oxide, namely. ($ZrO_2$); polysilanes $[R1R2Si—R1R2Si]_n$, perhydropolysilazane $[H_2Si—NH]_n$, polycarbosilanes $[R1R2Si—CH_2]_n$ polysiloxanes $[R1R2Si—O]_n$ polysilazanes $[R1R2Si—NR3]_n$.

2) A so-called "B" class-ceramic mineral matrix:

A mineral polymer, consisting of a poly(silico-oxo-aluminate) aluminosilicate, namely. $(—Si—O—Al—O—)_n$ such as metakaolin $(Si_2O_5,Al_2O_2)_n$, which is designated resin, and a hardener, dissolved in an aqueous solution, constituted by at least one of hydroxyls of silicon (Si), aluminum hydroxyl (Al), magnesium hydroxyl (Mg), zirconium hydroxyl (Zr), calcium hydroxyl (Ca)), said hardener is obtained using one of the adjuvants mentioned below:

alkali adjuvant consisting of at least one of the following bases: (KOH=potassium hydroxide, NaOH=sodium hydroxide).

acid adjuvant constituted by at least one of the following acids: (HCl=hydrochloric acid, $H_2SO_4$=phosphoric acid, HF=hydrofluoric acid).

a mineral polymer, consisting of a poly(silico-oxo-aluminate) aluminosilicate, namely. $(—Si—O—Al—O—)_n$ such as metakaolin $(Si_2O_5,Al_2O_2)_n$ supplemented with aluminum phosphate ($AlPO_4$), referred to as resin, and a hardener, dissolved in a solution aqueous solution consisting of at least one of the following hydroxyls: (silicon hydroxyl (Si), aluminum hydroxyl (Al), magnesium hydroxyl (Mg), zirconium hydroxyl (Zr), calcium hydroxyl (Ca)) said hardener is obtained using one of the adjuvants mentioned below:

alkali adjuvant consisting of at least one of the following bases: (KOH=potassium hydroxide, NaOH=sodium hydroxide)

acid adjuvant constituted by at least one of the following acids: (HCl=hydrochloric acid, $H_2SO_4$=phosphoric acid, HF=hydrofluoric acid), A mineral polymer consisting of a micronized alumina, namely. ($Al_2O_3$) which is denoted by resin, and a hardener, dissolved in an aqueous solution, constituted by at least one of the following hydroxyls: (hydroxyl of silicon (Si), hydroxyl of aluminum (Al), magnesium hydroxyl (Mg), zirconium hydroxyl (Zr), calcium hydroxyl (Ca)), said hardener is obtained by using one of the adjuvants mentioned below:

an alkaline adjuvant consisting of at least one of the following bases: (KOH=potassium hydroxide, NaOH=sodium hydroxide)

acid adjuvant constituted by at least one of the following acids: (HCl, $H_2SO_4$, HF);

A complex mineral polymer consisting of a poly(silico-oxo-aluminate) aluminosilicate, namely. (—Si—O—Al—O—) n such as metakaolin $(Si_2O_5,Al_2O_2)_n$ of a micronized alumina namely. ($Al_2O_3$) which is denoted by resin, and a hardener, dissolved in an aqueous solution, constituted by at least one of the following hydroxyls: (hydroxyl of silicon (Si), hydroxyl of aluminum (Al), magnesium hydroxyl (Mg), zirconium hydroxyl (Zr), calcium hydroxyl (Ca)), said hardener is obtained by using one of the adjuvants mentioned below:

an alkaline adjuvant consisting of at least one of the following bases: (KOH=potassium hydroxide, NaOH=sodium hydroxide)

acid adjuvant constituted by at least one of the following acids: (HCl, $H_2SO_4$, HF);

A complex mineral polymer consisting of a poly(silico-oxo-aluminate) aluminosilicate, namely (—Si—O—Al—O—)$_n$ such as metakaolin (Si$_2$O$_5$,Al$_2$O$_2$)$_n$ micronized magnesium oxide ie. (MgO) which is denoted by resin, and a hardener, dissolved in an aqueous solution, constituted by at least one of the following hydroxyls: (silicon hydroxyl (Si), aluminum hydroxyl (Al), magnesium hydroxyl (Mg), zirconium hydroxyl (Zr), calcium hydroxyl (Ca)), said hardener is obtained by using one of the adjuvants mentioned below:

an alkaline adjuvant consisting of at least one of the following bases: (KOH=potassium hydroxide, NaOH=sodium hydroxide)

acid adjuvant constituted by at least one of the following acids: (HCl, H$_2$SO$_4$, HF); and more generally any ceramic matrix known to those skilled in the art.

A network macro of reinforcing fibers in UD forms, fabrics, braid, felt or matte; these functionalized fibers, or not depending on their chemical composition, are chosen from conventional reinforcement materials such as functionalized boron fibers. Functionalized silica. Functionalized Quartz Basalt functionalized or not. *Functionalized glass. *Unfunctionalized carbon. *Silicon carbide not functionalized. *Functionalized ceramics (example alumina, or alumina mullite). *Zirconium unfunctionalized. *Stainless steel functionalized. *Inconel non functionalized Polysilazane functionalized. *Aramid, non-functionalized. *HD polyethylene (Example: DYNEEMA) not functionalized.

Preferably a micro reinforcement network as described in French Patent No. 14-02994 comprising functionalized dentritic nano-fractals (or not) characterized in that said dendritic nanofractals are either alkali-resistant or functionalized. This micro-network consists of dendritic nanofractals based on:

Metallic oxides, (titanium oxide TiO$_2$ zirconium oxide ZrO$_2$, etc.) non-functionalized metal oxides, (alumina Al$_2$O$_3$, etc.) functionalized or not Metalloid oxide such as silicon oxide=>silica: (silicon dioxide SiO$_2$), boron oxide=>boric anhydride: (borax anhydrous B$_2$O$_3$) functionalized or not metalloid oxide such as silicon carbide SiC no functionalized non-metals", such as phosphorus oxide=>phosphoric anhydride (P$_2$O$_5$); carbon black which is colloidal carbon (graphite). Non functionalized.

According to one characteristic of the invention, the dendritic nanofractals consist of nanopatatoids of 10 to 50 nanometers in diameter aggregated with each other by covalent bonds to thereby form dendrites, circumscribed in a potatoid of 50 to 1000 nanometers in diameter, measured under an electronic microscope or laser granulometer; the values of the surface of said dendritic nanofractals are included in a range of values whose lower limit is about 10 square meters per gram and whose upper limit is about 750 square meters per gram, this value is called specific surface. The specific surface area of a powder is estimated from the amount of nitrogen adsorbed in relation to its pressure at the boiling point of liquid nitrogen and at normal atmospheric pressure. The information is interpreted according to the model of Brunauer, Emmett and Teller (BET method).

The expression "potatoïdes", as used in the present description, means a form as defined for example in the dictionaries=A surface is called a patatoïde (or is called "patatoïdale") when it is irregular and looks like an apple. ground (or "potato"). The term can be applied to a related volume in space but also to spherical or substantially spherical shapes. In topology, the Hausdorff dimension of a metric space (X, d) is a positive real number or zero, preferably random (non-homogeneous) lengths. In the aggregated structures of nanospheres implemented according to the invention, the Hausdorff dimension is between 1.5 and 2.5. These structures are called "dendritic nanofractals". By "patatoid volume circumscribed to a dendritic nanofractal" is meant any three-dimensional volume, spherical or potatoid, including a cylinder. The statistical distance between two glass fibers in a matrix is of the order of 5,000 nanometers; it is therefore desirable, under these conditions, to have a large number of particles smaller than this size to avoid a "filtering" effect. The nanofractals of the composite matrix according to the invention respond well to this specification. It is referred to herein as "charges", any type of functionalized or non-functionalized charges, that is to say any type of dendritic nanofractal described above. According to another characteristic of the invention, the dendritic nanofractals are in the form of at least one of the following structures: dendritic aggregates of nanopatatoids constituting dendritic nanofractals of chemical composition different from one dendritic nanofractal to the other; dendritic aggregates of nanopatatoids constituting dendritic nanofractals functionalized by functionalization agents of chemical composition different from a functionalized dendritic nanofractal to the other. "Accessible surface" means the entire surface of a dendritic nanofractal made of nanopatatoids which can be reached by a functionalizing agent on which it can be grafted, that is to say the surface unhindered by the presence of another nanopatatoid in the immediate vicinity which will cause a "steric hindrance" hindering the implantation of the functionalizing agent. It is possible to measure the average particle size using, for example, a laser diffraction particle analyzer. One can also use an electron microscope, for example scanning, and see the shape of the nanoparticles. To verify the presence of a mono-molecular layer, one can for example use a "tunnel electron microscope". The key point of the process according to the invention consists in depositing the hydrolysis products, and then the surfactant, using the nano-aggregate as a nano reactor; the amount of water deposited will be calculated to exactly match the amount of water required for hydrolysis; because of surface tension phenomena, the water is evenly distributed in a nanometer-sized layer on the surface of the nano aggregate. Thus, when the surfactant "lands" on the water, it is hydrolysed on site and there is so little water that the surfactant cannot move to polycondense with a neighboring surfactant so it forms a very thin layer called mono molecular.

The "elastic microelements" (EME) (1) consist of linear elastic molecular chains, terminated at their ends by functions capable of chemically bonding to solid "micro ceramic domains" (MCD) (2). This elastic network is preferably chosen from molecular chains belonging to the family of fluid silicone homopolymers (Polysiloxanes) with active terminations.

There are 5 main families of such homopolymers. These homopolymers are constituted by molecular chains:
I. OH terminated
II. H-terminated
III. Hybrid H-terminated on one side and OH on the other
IV. Alcohol-terminated (methanol or ethanol)
V. Vinyl-terminated Polydimethylsiloxanes (PDMSs) are by far the largest volume of homopolymers produced. The molar mass is controlled by the addition of chain finishing monomers which may or may not be reactive. The purpose of the terminal reactive groups is to be able to cross-link the chains by condensation (amine, alkoxyl, hydroxyl, acetate, oxime, silanol, etc. groups) or radically (vinyl groups, etc.). The trimethylsiloxy-terminated polydimethylsiloxane is the most manufactured silicone. It is used as a fluid product, pasty or in the form of crosslinked elastomer. Due to the small intermolecular forces, the polymers always have boiling points and glass transition temperatures very low and, under normal conditions, they do not crystallize. The freedom of rotation around the siloxane bond gives the siloxane chains great flexibility, and compared to other polymers, small changes in physical properties with molar mass and temperature.

Typical Mechanical Properties

| | |
|---|---|
| Hardness, shore A | 10-90 |
| Tensile stress | 11 N/mm$^2$ |
| Elongation at break | 100-1100% |
| Highest temperature | +300° C. |
| Minimal temperature | −120° C. |

The "terminally active silicone homopolymers" described below are a non-exhaustive list of the EMEs that we claim:

I. OH-terminated molecular chains

Siloxane chains, such as "silanol-terminated poly(dimethylsiloxane)" are very flexible and rotation around the Si—O axis is very easy, especially with small substituents. Rotation is also possible around the Si—C axis for methyl silicones. The freedom of rotation around the siloxane bond gives the siloxane chains great flexibility, and compared to other polymers, small changes in physical properties with molar mass and temperature. FIG. 1 shows the chemical formula of Poly(dimethylsiloxane), hydroxy terminated, or (Dimethiconol) (case 31692-79-2) and FIG. 2 shows its spatial representation. * The poly(dimethylsiloxane) terminated silanol (hydroxy terminated) is the basic brick from which is obtained by polymerization of silicone.

The viscosity of this chain depends on its length and thus on (n) number of repetitions of the base unit (see FIG. 1). The viscosity in (mPas) at 25° C. varies from 80 to 400,000. Preferably for the CCEM it is It is preferable to use small monomers, therefore of low viscosity. * Siloxane chains such as Silanol terminated polydimethylsiloxane (case 70131-67-8) of molecular formula: HO[—Si(CH$_3$)$_2$O-]$_n$H *Siloxane chains such as vinylmethylsiloxane-dimethylsiloxane copolymers, trimethyl (case 67923-19-7).

II. H-terminated molecular chains
Chains such as Hydride terminated polydimethylsiloxane (Case 70900-21-9)
Chains such as Phenylsilsesquioxanes, hydrogen-terminated (Case 68952-30-7)

III. H-terminated hybrid molecular chains on one side and OH on the other
Chains such as Polytrifluoropropylmethylsiloxane, silanol terminated (Case 68607-77-2)
Chains such as 1,1,3,3-Tetramethyldisiloxane (Cas 3277-26-7) of molecular formula C$_4$H$_{14}$OSi$_2$
Chains such as Hydride terminated polydimethylsiloxane (Case 70900-21-9)

IV. Molecular chains with alcohol termination
Chains such as triethoxy (2,4,4-trimethylpentyl) silane (Cas 35435-21-3) of molecular formula C$_{14}$H$_{32}$O$_3$Si
Chains such as Poly (methylhydrosiloxane) (Cas 63148-57-2) of molecular formula C$_7$H$_{22}$O$_2$Si$_3$ Chains such as Poly (dimethylsiloxane-co-methylphenylsiloxane) (Cas 63148-52-7) of molecular formula C$_{21}$H$_{24}$O$_3$Si$_3$X2
Chains such as Poly (dimethylsiloxane) (Cas 63148-62-9) of molecular formula C$_6$H$_{18}$OSi$_2$
Chains such as Polydiethylsiloxane, triethylsiloxy terminated (Cas 63148-61-8) of molecular formula C$_6$H$_{15}$OSi.(C$_4$H$_{10}$OSi)$_n$.C$_6$H$_{15}$Si
Chains such as Poly [trifluoropropyl (methyl) siloxane] (Cas 63148-56-1) of molecular formula (C$_4$H$_7$F$_3$OSi)$_n$
Chains such as Poly (methyl-3,3,3-trifluoropropylsiloxane) (Case 115361-68-7)
Strings such as Methylhydrosiloxane, dimethylsiloxane copolymer, trimethylsi (case 68037-59-2) of molecular formula C$_3$H$_{12}$OSi$_2$
Chains such as vinylmethylsiloxane-dimethylsiloxane copolymers, trimethyl (case 67762-94-1) of molecular formula C$_5$H$_{14}$OSi$_2$ V. Molecular chains with vinyl termination
Chains such as Vinyl terminated polydimethylsiloxane (case 68083-19-2)
Chains such as vinylmethylsiloxane, dimethylsiloxane copolymer, vinyl terminated (case 68083-18-1)
Chains such as vinyl terminated poly-phenylmethylsiloxane (case 225927-21-9)
Chains such as vinyl terminated diphenylsiloxane, dimethylsiloxane copolymer (case 68951-96-2)
Chains such as vinyl terminated trifluoropropylmethylsiloxane, dimethylsiloxane copolymer (case 68951-98-4)

Figure 1:
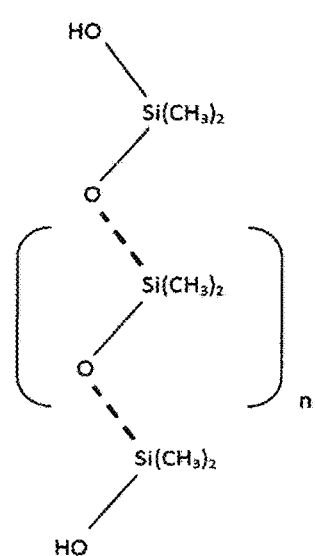
FIG. 1 is a chemical representation of an example of homopolymers of fluid silicone with active terminations (1) also called "elastic microelement" (EME). (In the example shown, it is an OH termination), where n is the number of iterations of the base module.
Figure 2:
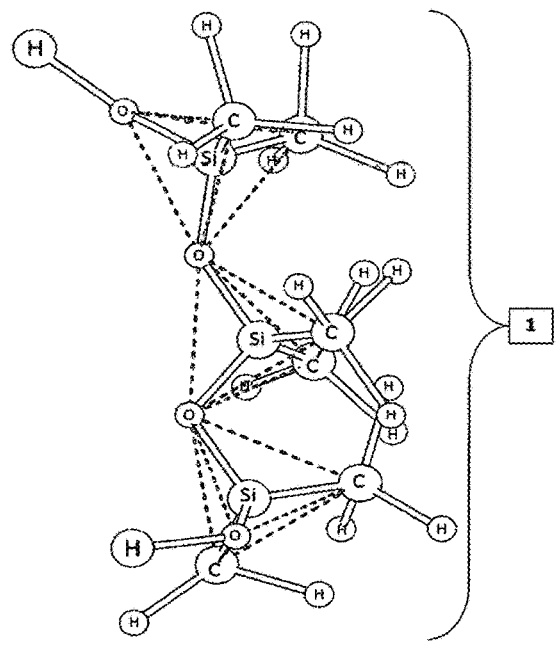
FIG. 2 is a spatial representation of an example of homopolymers of fluid silicone with active terminations (1) also called "elastic microelement" (EME).
Figure 3:
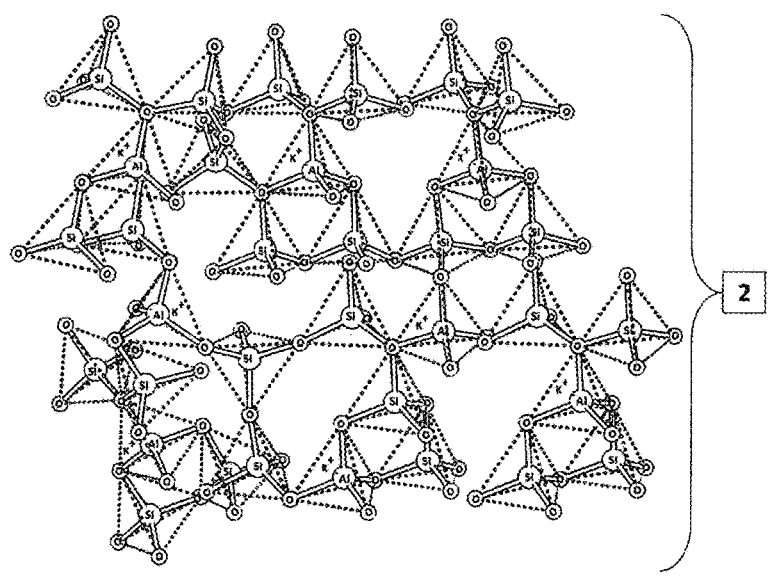
FIG. 3 spatial representation of an example of solid "micro ceramic domains" (MCD) (2)
Figure 4:
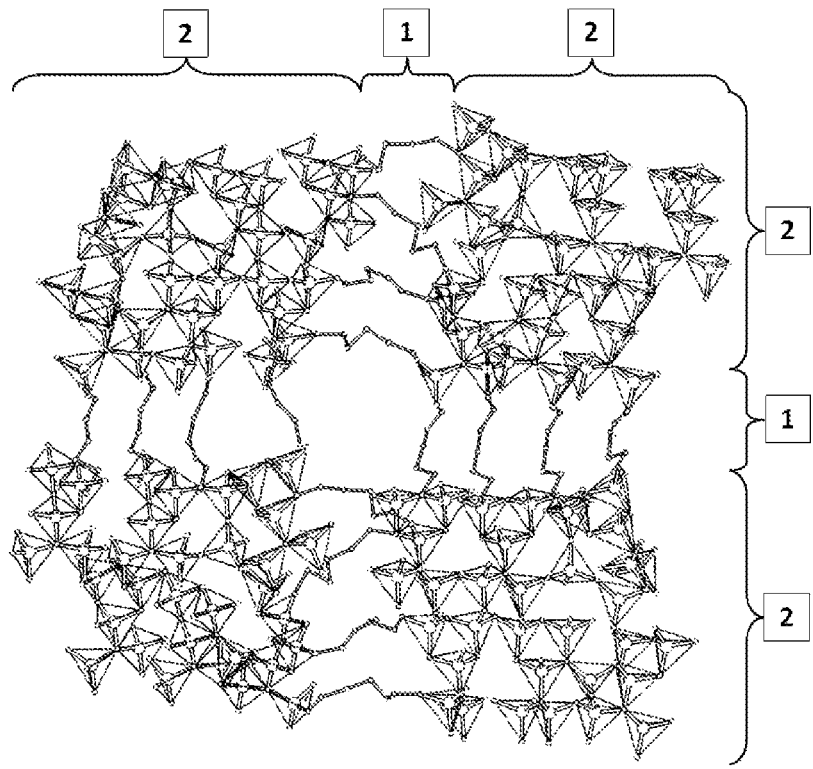
FIG. 4 spatial representation of an example of solid "micro ceramic domains" (MCD) (2) interconnected three-dimensionally by a dense network of "micro elastic elements" (EME) (1). This set constitutes an "elastic ceramic matrix" (ECM). It suffices to add to this matrix a network macro and preferentially a micro reinforcement network to result in an "elastic ceramic matrix composite" (ECMC)
Figure 5:
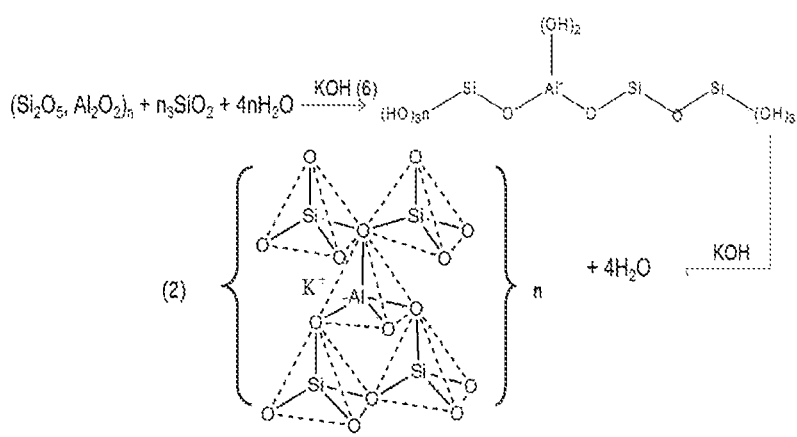
FIG. 5 shows an example of polymerization=polycrystallization of a solid "ceramic micro-domain" (CMD) (2). Water (5) is used in which, for example, caustic soda (6) is dissolved in order to obtain a pH 11. The silica dispersed in this water is then converted into silicate (4). The liquid thus obtained is mixed with metakaolin (3). This gives a slip. During the polycrystallization, oxide ceramic crystals are obtained (2).

An alkaline solution is a solution of water in which we dissolved an alcaly such as: sodium hydroxide, or caustic soda (NaOH). *sodium carbonate (Na$_2$CO$_3$). *Potassium hydroxide, or caustic potash (KOH). *The K+ cation is less soluble in water than the Na+ cation. In addition, it is more difficult to complex, and can be more easily retained by compounds, such as clays. It is therefore more interesting in our applications.

Radical type vulcanization, of the fluid silicone homopolymer, can be carried out in a few minutes at temperatures above 110° C., using one or more organic peroxides (benzoyl peroxide and dicumyl peroxide for simplest cases) in low proportion (1 to 2%).

It is possible to cure with an organotannous catalyst (dibutyltin dilaurate), $(nC_4H_9)_2Sn(OOCC_{11}H_{23})_2)$, this reaction can be accelerated by the addition of a platinum salt.

The invention claimed is:

1. Production method of a ceramic composite with an elastic matrix, the method comprises the following steps:
   Step 1: an admixture comprising at least one of the following elements is dispersed in water: an alkali or an acid, to obtain "an adjuvant in aqueous solution",
   Step 2: then, in the said adjuvant in aqueous solution, an additive is reacted to obtain a "mineral hardener",
   Step 3: finally prepare a "mineral resin powder",
   Step 4: said mineral hardener is poured and intimately mixed into said mineral resin powder to form a "ceramic mixture",
   wherein, the preparation of a "fluid silicone homopolymer with active terminations" is carried out, and during the preparation of a "fluid silicone homopolymer with active terminations", the dispersion of a homopolymer of fluid silicone with active terminations is performed,
   wherein the preparation of a "fluid silicone homopolymer with active terminations" is carried out either after step 3 or after step 4 to obtain said "elastic ceramic mixture".

2. Method according to claim 1, further comprising: Step 7, consisting in impregnating said "elastic ceramic mixture" obtained at the end of step 6, with means of "fibrous reinforcements", then obtain a "ceramic composite with elastic matrix".

3. Method according to claim 2, further comprising an additional step 8, of dispersing, in the mixture, a micro reinforcement network consisting of "dendritic nanofractals".

4. Method according to claim 3, wherein: "dendritic nanofractals" have nanopatatoid forms of 10 to 50 nanometers in diameter aggregated together by covalent bonds to thereby form dendrites, circumscribed in a patatoid volume of 50 to 1000 nanometers in diameter, values of the surface of said dendritic nanofractals being included in a range of values whose lower limit is approximately 10 square meters per gram and whose upper limit is about 750 square meters per gram (measured according to the BET.

5. Method according to claim 3, wherein the dendritic nanofractals are formed based on a combination of at least one of the following products:
   Metal oxides, not functionalized
   Metal oxides, functionalized
   Metalloid oxide, functionalized
   Metalloid oxide, unfunctionalized
   Nonmetals, not functionalized.

6. Method according to claim 1 wherein:
   said alkali is constituted by at least one of the following bases:
   KOH=potassium hydroxide,
   NaOH=sodium hydroxide,
   CsOH=cesium hydroxide,
   LiOH=lithium hydroxide, and
   the said acid being constituted by at least one of the following acids: HCl=hydrochloric acid, H2SO4=sulfuric acid, HF=hydrofluoric acid, $H_3PO_4$=phosphoric acid, to obtain an "adjuvant in aqueous solution"
   said additive is constituted by at least one of the following elements:
   an oxide of silicon, aluminum, magnesium, zirconium, calcium,
   a metal comprising aluminum, magnesium, zirconium, or calcium and
   a metalloid of silicon, to obtain said "mineral hardener"
   said mineral resin powder consists of at least one of the following elements:
   a mineral polymer comprising a poly(sialate), (Si/Al ratio=1),
   a mineral polymer comprising a poly (sialate-siloxo), (Si/Al ratio=2),
   a polymer mineral comprising an aluminosilicate, poly (sialate-disiloxo), (Si/Al ratio=3);
   a mineral polymer comprising an aluminosilicate, poly (sialate-disiloxo), supplemented with aluminum phosphate (AlPO4);
   a complex mineral polymer comprising a poly(sialate-disiloxo) aluminosilicate, (Si/Al ratio=3) and a micronized alumina;
   a complex mineral polymer comprising metakaolin $(Si_2O_5,Al_2O_2)_n$ and a micronized magnesium oxide;
   a complex mineral polymer comprising a metakaolin $(Si_2O_5,Al_2O_2)_n$ of micronized magnesium oxide;
   a complex mineral polymer comprising metakaolin $(Si_2O_5,Al_2O_2)_n$ of a micronized calcium oxide
   said active-terminated liquid silicone homopolymer comprises at least one of the following terminations: OH-terminus, H-terminus, H-terminal hybrid on one side and OH on the other, termination methanol, ethanol terminus.

7. Method according to claim 3, wherein the "fibrous reinforcements" are chosen from at least one of the following functionalized fibers:
   *Bore fibers
   *Silica functionalized
   *Quartz functionalized
   *Basalt not functionalized
   *Basalt functionalized
   *Functionalized glass
   *Carbon not functionalized
   *Silicon carbide not functionalized
   *Functionalized ceramics
   *Non-functionalized zirconium
   *Stainless steel functionalized
   *Functionalized polysilazane
   *Aramid, non-functionalized
   *Polyethylene HD.

8. Method according to claim 1, further comprising an additional step 8, of dispersing, in the mixture, a micro reinforcement network consisting of "dendritic nanofractals".

9. The method of claim 5, wherein the dendritic nanofractals are formed based on a combination comprising a functionalized metal oxide selected from a group consisting of titanium oxide and zirconium oxide.

10. The method of claim 5, wherein the dendritic nanofractals are formed based on a combination comprising a functionalized metal oxide in the form of alumina.

11. The method of claim 5, wherein the dendritic nanofractals are formed based on a combination comprising a functionalized metalloid oxide selected from a group consisting of_silicon oxide, boron oxide, and boric anhydride.

12. The method of claim 5, wherein the dendritic nanofractals are formed based on a combination comprising an unfunctionalized metalloid oxide in the form of silicon carbide.

13. Method according to claim 3, wherein the dendritic nanofractals are formed based on a combination of at least one of the following products:
   Metal oxides, not functionalized
   Metal oxides, functionalized
   Metalloid oxide, functionalized
   Metalloid oxide, unfunctionalized
   Nonmetals, not functionalized.

14. Method according to claim 3, wherein the dendritic nanofractals are formed based on a combination of at least one of the following products:
   a metal oxide, selected from the group consisting of titanium oxide, not functionalized and zirconium oxide, not functionalized;
   alumina, functionalized;
   a metalloid oxide, selected from the group consisting of silicon oxide, functionalized, boron oxide, functionalized, and boric anhydride, functionalized;
   silicon carbide, unfunctionalized; and
   a nonmetal, selected from the group consisting of phosphorus oxide, not functionalized, phosphoric anhydride, not functionalized, and carbon black, not functionalized.

15. Method according to claim 4, wherein the dendritic nanofractals are formed based on a combination of at least one of the following products:
   a metal oxide, selected from the group consisting of titanium oxide, not functionalized and zirconium oxide, not functionalized;
   alumina, functionalized;
   a metalloid oxide, selected from the group consisting of silicon oxide, functionalized, boron oxide, functionalized, and boric anhydride, functionalized;
   silicon carbide, unfunctionalized; and
   a nonmetal, selected from the group consisting of phosphorus oxide, not functionalized, phosphoric anhydride, not functionalized, and carbon black, not functionalized.

16. Method according to claim 3, wherein the dendritic nanofractals are 10 to 50 nanometers in diameter aggregated together by covalent bonds to thereby form dendrites, circumscribed in a volume of 50 to 1000 nanometers in diameter, values of the surface of said dendritic nanofractals being included in a range of values whose lower limit is approximately 10 square meters per gram and whose upper limit is about 750 square meters per gram measured according to the BET.

* * * * *